United States Patent [19]

Rosty et al.

[11] Patent Number: 4,835,016

[45] Date of Patent: May 30, 1989

[54] ADHESIVE BONDING

[75] Inventors: Roberta Rosty, Saddle Brook; David W. Levi, Succasunna, both of N.J.

[73] Assignee: The United States of America as represented by the Secretary of the Army, Washington, D.C.

[21] Appl. No.: 173,966

[22] Filed: Mar. 28, 1988

[51] Int. Cl.$^4$ ............................................. B05D 3/10
[52] U.S. Cl. .................................... 427/307; 427/444; 156/668
[58] Field of Search ................. 427/307; 156/668, 444

[56] References Cited

U.S. PATENT DOCUMENTS

| | | | |
|---|---|---|---|
| 3,235,426 | 2/1966 | Bruner | 156/668 |
| 3,553,085 | 1/1971 | Heymann | 427/307 |
| 4,086,128 | 4/1978 | Sugio et al. | 427/307 |
| 4,386,175 | 5/1983 | Kuramochi et al. | 156/668 |
| 4,448,811 | 5/1984 | Doty et al. | 427/307 |

*Primary Examiner*—Janyce Bell
*Attorney, Agent, or Firm*—Robert P. Gibson; Edward Goldberg; Edward F. Costigan

[57] ABSTRACT

A method of pretreating a polyolefin for adhesive bonding. The method involves contacting the polyolefin with a non-chromate solution such as either lead dioxide, potassium iodate or ammonia persulfate in a combination of water and sulfuric acid.

4 Claims, No Drawings

ADHESIVE BONDING

GOVERNMENTAL INTEREST

The invention described herein may be manufactured, used and licensed by or for the Government for Governmental purposes without payment to us of any royalties thereon.

FIELD OF INVENTION

This invention relates in general to adhesive bonding of polyolefins. More particularly, this invention relates to a surface preparation of polyolefins prior to adhesive bonding.

BACKGROUND OF INVENTION

Untreated polyolefin surfaces are difficult to adhesive bond because of their non-polarity and non-porosity. Polyolefins also have low surface and cohesive energies which are poor adhesive bonding characteristics. For these reasons, polyolefin surfaces must be treated prior to adhesive bonding.

SUMMARY OF INVENTION

It is an object of this invention to provide an improved surface preparation of polyolefins prior to adhesive bonding.

Another object is to provide an improved chemical treatment for a polyolefin surface.

A further object is to provide a treatment of polyolefins consisting of an aqueous solution of lead dioxide and sulfuric acid.

A still further object is to provide a treatment of polyolefins consisting of an aqueous solution of potassium iodate and sulfuric acid.

Another object is to provide a treatment of polyolefins consisting of ammonium persulfate and sulfuric acid.

And still another object is to provide a treatment of polyolefins consisting of bleach and detergent.

PREFERRED EMBODIMENT

The tests were accomplished in accordance with the procedure set forth in ASTM specification D3164(4). Although the specimens are more difficult to fabricate, the aluminum substrate used is rigid with the polyolefin serving as the sandwich material. The lap shear test gave shear strength data for the various treated polyolefin surfaces. The results were compared between the control, the standard treatment of the art, and the polyolefin treatments of this invention.

The only variable is the polyolefin treatments. The aluminum surface treatment, the adhesive, and the adhesive curing conditions remained constant.

STANDARD TREATMENT

The current polyolefin treatment of the art prior to adhesive bonding consists in an aqueous solution of potassium dichromate in sulfuric acid. To be more specific, this solution consists in 7.5 g of potassium dichromate, 12 g of water, and 82 mls. of sulfuric acid.

REPLACEMENTS FOR STANDARD SOLUTION

It has been found that four alternate solutions are each a replacement for the standard solution. They include the following, viz.

1. Solution A; which is in ratio of about:
   6.3 g lead dioxide,
   12 g of water, and
   82 mls. sulfuric acid;
2. Solution B; which is in ratio of about:
   5.5 g potassium iodate,
   12 g of water,
   82 mls. sulfuric acid;
3. Solution C; which is in ratio of about:
   4.4 g of ammonium persulfate,
   204.1 g of sulfuric acid, and
4. Solution D; which is in ratio of about:
   73.5 mls. of bleach,
   3.5 g of detergent Lap shear specimens were made to test the treatments in the following way. The aluminum specimens were degreased, and etch in an agitated bath for 11 minutes at 150° F.±7° F. The etching solution consisted of an aqueous solution of 150 g ferric sulfate, and 370 g sulfuric acid. The polyolefin material was then contacted with a specified solution for the amount of time, and solution temperature indicated in the tables hereafter set forth. The polyolefin sandwich material was then bonded with Epon 828, an epoxy resin, and V-140, a curing agent, between aluminum sheets. The latter adhesive is commercially available from the Shell Chemical Co., Houston, Tex. The joint was weighted and cured for four hours at 70° C. Cuts were made through both sides of the sandwiched material. This was through the cured adhesive flash, and the polyolefin material.

To be more specific, after trimming the aluminum specimen for testing as 0.063"×1"×5" in dimension. The latter formed a sandwich with the polyolefin therebetween. The polyolefin sandwiched material for testing is 0.029"×½"×1" in dimension.

RESULTS

The cured joints were pulled to failure under a tensile shear force in accordance with ASTM D3164-73. The tests were run using a Instron tensile tester. The crosshead speed was 0.05 inches per minute, while the chart speed was 0.5 inches per minute.

When low density polyethylene was used, the following lap shear strength were obtained as set forth in Table A.

TABLE A

| Surface Treatment | Lap Shear* Tensile Strengths (psi) | Surface Treatment | Lap Shear* Tensile Strengths (psi) |
| --- | --- | --- | --- |
| Standard Treatment 1 Week at Room Temperature | 1410 1510 1610 1620 1640 1680 1770 | Solution A (lead dioxide, sulfuric acid and water.) | 1200 1320 1380 1380 1720 1780 |

TABLE A-continued

| Surface Treatment | Lap Shear* Tensile Strengths (psi) | Surface Treatment | Lap Shear* Tensile Strengths (psi) |
|---|---|---|---|
| | 2020 | | |
| 100% failure within LDPE | Mean = 1660 psi SD = 182 | 100% failure within LDPE | Mean = 1460 psi SD = 232 |
| Solution D (Bleach/ Detergent) 1 Week at Room Temperature | 1460 1500 1540 1580 1590 1640 1680 | Solution B (Potassium iodate, sulfuric acid, water) 1 Week at Room Temperature | 1160 1220 1220 1340 1350 1430 1440 |
| 100% failure within LDPE | Mean = 1610 psi SD = 134 | Adhesive failure but some LDPE stretching | Mean = 1310 psi SD = 110 |
| Solution E: Control Treatment: acetone degreased | 110 110 120 130 150 160 190 220 | Solution C (Ammonium persulfate & sulfuric acid) 1 Weeks at Room Temperature | 1230 1260 1290 1300 1364 1440 |
| All Adhesive failure | Mean = 150 psi SD = 40 | Polyethylene shearing | Mean = 1310 psi SD = 76 |

When polypropylene (PP) was used as the sandwich material, the lap shear strengths obtained were set forth in Table B.

TABLE B

| Surface Treatment | Lap Shear* Tensile Strength (psi) | Surface Treatment | Lap Shear* Tensile Strength (psi) |
|---|---|---|---|
| Standard Treatment 1 Week at Room Temperature | 2040 2500 2560 2760 2760 2880 2920 3260 | Solution A (lead dioxide, sulfuric acid and water) 1 Week at Room Temperature | 1340 1400 1560 1580 1680 1820 1900 2000 |
| PP stretching and tearing | Mean = 2710 psi SD = 358 | PP tearing and cracking | Mean = 1660 psi SD = 235 |
| Solution D (Bleach/ Detergent) 1 Week at Room Temperature | 1240 1500 1560 1600 1640 1840 1880 1940 | Solution B (Potassium iodate sulfuric acid and water) 2 Hours at 71° C. | 180 200 200 240 |
| PP cracking and tearing | Mean = 1650 psi SD = 231 | | Mean = 210 psi SD = 25 |
| Solution E: Control | 0 0 70 70 80 80 80 80 | | |
| All adhesive failure | Mean = 60 psi SD = 36 | | |

SD = Standard Deviation

The foregoing disclosure is merely illustrative of the principles of this invention and is not to be interpreted in a limiting sense. We wish to be understood that we do not desire to be limited to the exact details of the described because obvious modifications will occur to a person skilled in the art.

We claim:

1. In an improved method of preparing a polyolefin surface for adhesive bonding, the improvement consisting essentially of contacting said polyolefin surface with a non-chromate solution selected from the group consisting of solutions A, B, and C wherein:

Solution A is in ratio of about:
    6.3 grams lead dioxide,
    12 grams water, and
    82 mls sulfuric acid;
Solution B is in ratio of about
    5.5 grams potassium iodate,
    12 grams water,
    82 mls sulfuric acid; and
Solution C is in ratio of about
    4.4 gram ammonium persulfate
    204.1 grams sulfuric acid.

2. The method of claim 1 wherein said solution consists in ratio of about 6.3 g. lead dioxide, 12 g. water, and 82 mls sulfuric acid.

3. The method of claim 1 wherein said solution consists in ratio of about 5.5 g. potassium iodate, 12 g. water, and 82 mls sulfuric acid.

4. The method of claim 1 wherein said solution consists in ratio of about 4.4 g. ammonium persulfate, and 204.1 g. sulfuric acid.

* * * * *